United States Patent
Weir et al.

(10) Patent No.: US 7,890,442 B2
(45) Date of Patent: Feb. 15, 2011

(54) METHOD AND SYSTEM FOR AUTOCOMPLETION OF MULTIPLE FIELDS IN ELECTRONIC FORMS

(75) Inventors: Robert C. Weir, Westford, MA (US); Asima Silva, Holden, MA (US); Ping Wang, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 11/551,556

(22) Filed: Oct. 20, 2006

(65) Prior Publication Data

US 2008/0154824 A1    Jun. 26, 2008

(51) Int. Cl.
*G06F 17/00* (2006.01)
*G06N 5/00* (2006.01)

(52) U.S. Cl. .............................. 706/45; 706/46; 706/47

(58) Field of Classification Search .................. None
See application file for complete search history.

(56) References Cited

U.S. PATENT DOCUMENTS

| | | | |
|---|---|---|---|
| 5,704,017 | A | 12/1997 | Heckerman et al. |
| 6,208,339 | B1 | 3/2001 | Atlas et al. |
| 6,490,601 | B1 | 12/2002 | Markus et al. |
| 6,732,090 | B2 * | 5/2004 | Shanahan et al. ............ 707/3 |
| 6,910,179 | B1 | 6/2005 | Pennell et al. |
| 2004/0205530 | A1 | 10/2004 | Borg |
| 2005/0149854 | A1 | 7/2005 | Pennell et al. |
| 2005/0198563 | A1 * | 9/2005 | Kristjansson ............ 715/507 |
| 2005/0257134 | A1 | 11/2005 | Goodman et al. |
| 2006/0047548 | A1 | 3/2006 | Ulmer et al. |

OTHER PUBLICATIONS

Nkweteyim, Denis, "A Collaborative Filtering Approach to Predict Web Pages of Interest From Navigation Patterns of Past Users within an Academic Website", 2005.*
Buono et al., Paolo, "Integrating User Data and Collaborative Filtering in a Web Recommendation System", 2002.*

(Continued)

*Primary Examiner*—Michael B. Holmes
*Assistant Examiner*—Adrian L Kennedy
(74) *Attorney, Agent, or Firm*—David A. Dagg (57) ABSTRACT

A method and system for autocompletion of multiple fields in electronic forms that generates "inference networks" (Bayesian networks), and evaluates them to suggest likely options for user selection while filling out fields in corresponding electronic forms. The disclosed Bayesian networks are generated and evaluated based on a broad set of information. The information used by the disclosed system for generating an inference network includes form previously selected field values. The information used in the disclosed system to evaluate an inference networks while a current instance of a given form is being filled out includes values previously entered by a current user into preceding form fields, and values of ambient variables that are external to the forms, such as current day of the week, current time of day, etc. When the inference network is evaluated in this way, posterior probabilities are determined for values of fields not yet filled out in the current form instance. These posterior probabilities are used to present value options for the unfilled fields in a way that makes selection of the most-probable options convenient to the user.

15 Claims, 5 Drawing Sheets

OTHER PUBLICATIONS http://www.mozilla.org/projects/ui/communicator/browser/formfill/.
Softinform's iNetFormFiller: http://www.inetformfiller.com/.
Patil Systems's LiveFORM: http://www.patils.com/liveform.htm.
http://searchdomino.techtarget.com/ateQuestionNResponse/0,289625, sid4_cid528432_tax294093,00.html.
http://en.wikipedia.org/wiki/Prior_probability.
http://www.cs.ubc.ca/~murphyk/Bayes/Charniak_91.pdf.
Neapolitan, Learning Bayesian Networks, Pearson Prentice Hall, Inc., Upper Saddle River, NJ 07458, 2004, 7 pages.

* cited by examiner

Purchase Check Out Form

User Interface 56 presenting an instance of a Purchase Check Out Electronic Form

- 58 — Is this a gift order?   Yes ___   No ___
- 60 — Shipping method?   Normal ___   Express ___
- 62 — First Name? _______   64 — Last Name? _______
- 66 — Street? _______   68 — City? _______
- 70 — State? _______   72 — Zipcode? _______

METHOD AND SYSTEM FOR AUTOCOMPLETION OF MULTIPLE FIELDS IN ELECTRONIC FORMS

FIELD OF THE INVENTION

The present invention relates generally to electronic forms systems, and more specifically to a method and system for autocompletion of electronic forms based on generation and evaluation of Bayesian networks.

BACKGROUND OF THE INVENTION

As it is generally known, electronic forms are commonly used to obtain various specific types of data from computer system users. When filling out electronic forms, via Web pages or other software application programs, the user frequently finds that they are entering the same data repeatedly. For example, consumers of products or services offered over the World Wide Web ("Web") are constantly entering their names, addresses, etc., for collection by on-line retailers. For users that enter form data as part of their work, for example in jobs that include insurance claim processing, medical records transcribing, etc., their productivity may be determined by their rate and accuracy in filling out electronic forms. In these cases and others, if some significant fraction of the fields in a form could be filled out more quickly, or even automatically filled out, the result could be a valuable increase in productivity and accuracy, benefiting the bottom line for many companies and/or individuals.

A number of different approaches to this problem have been tried in the past. Some existing systems have automatically filled out the entirety of certain types of forms with personal information associated with an individual user, such as the user's name, address, credit card numbers, etc. This approach is the basis of existing solutions such as Microsoft® Wallet, which was at one time an optional component of Microsoft Internet Explorer®. In that technology, a user was allowed to enter personal information into the application program, and then to automatically send that previously entered information (e.g. name, address, credit card number, etc.) to cooperating Websites. However, this type of solution has been plagued by security problems, and typically only worked for a predefined set of personal data items that the application was programmed to recognize. Other examples of this prior approach include Mozilla's Automatic Form Fill feature, Softinform's iNetFormFiller, and Patil Systems' LiveFORM.

Another existing approach to this problem has been field autocompletion, as has been provided in existing systems such as Microsoft Internet Explorer. In this approach, each individual form field "remembers" previous values which have been entered into that field, and suggests these values based on the initial letters entered into that field by the user. For example, typing "Ma" into a "STATE:" field might be sufficient in such systems to trigger the suggestion of "Massachusetts" and "Maryland". This type of existing solution has at least two significant shortcomings. First, it includes no way to rate the suggested autocompletions by probability. Accordingly, there is no way to take into account the fact that, in an application offered nationwide, "W" is more likely to be an indicator for "Washington" than for "Wyoming", whereas the opposite might be true for an application offered to users by a local company based in Cheyenne, Wyo. Second, autocompletion typically applies to only a single field at a time. It does not use the values of other fields in the form to improve its recommendations.

Still other existing approaches have suggested the most-commonly-used value for a field, based on previous values entered into that field. For example, the offered options for a "COUNTRY:" field might list "United States" first, rather than require the user to scroll down a list of countries to just before the "Uzbekistan" entry in order to select it. This is a first-order approach and uses only the "prior probabilities" (a term of art, viz. http://en.wikipedia.org/wiki/Prior_probability) to suggest most-likely values of the field. And some existing systems have operated to lookup form values from a database, thus essentially hard-coding the form/field relationship's in advance. The drawback of these approaches is that they do not take advantage of all available information in the form. In particular, they do not use the values from previously filled out fields in the form to make a better guess as to the value of subsequent fields. By not having this ability, they are not able to make as many correct guesses, and therefore require their users to perform more manual data entry, with resulting less productivity.

For these reasons and others, it would be desirable to have a new system for autocompletion of multiple fields in electronic forms. The new system should be generally applicable beyond a predefined set of personal data items, be able to rate and present field options using probabilities based on values of other fields in previously completed forms, and also use the values of previously filled out fields in a current form with regard to generating the probabilities used to rate and present the options for subsequent fields in the current form.

SUMMARY OF THE INVENTION

To address the above described and other shortcomings of the prior art, a new method and system for autocompletion of multiple fields in electronic forms is disclosed. The disclosed system generates Bayesian Inference Networks (referred to herein for purposes of explanation as "inference networks"), and evaluates them to suggest likely options for user selection while filling out fields in corresponding electronic forms. The disclosed Bayesian networks are generated and evaluated based on a broad set of information. The information used by the disclosed system for generating an inference network includes values previously selected by one or more users for multiple fields contained in one or more form templates. The information used in the disclosed system to evaluate an inference networks while a current instance of a given form is being filled out includes values previously entered by a current user into preceding form fields, and values of ambient variables that are external to the forms, such as current day of the week, current time of day, etc. When the inference network is evaluated in this way, posterior probabilities are determined for values of fields not yet filled out in the current form instance. These posterior probabilities are used to present value options for the unfilled fields in a way that makes selection of the most-probable options convenient to the user.

In one embodiment, each node in the inference network represents a single form field. The directed arcs (conditional probabilities) of the inference network are generated such that each form field depends on all preceding form fields, according to a natural reading order associated with a corresponding form, e.g., left-to-right, top to bottom in an English form. As new posterior probabilities are calculated for any values associated with unfilled fields, when a probability associated with such a field value is at least as large as a predefined or user-defined probability threshold (e.g. 95%), then that field value is recommended to the user in the user interface in a way that makes it convenient for the value to be selected for the field.

In another embodiment, drop down lists of field values generated by the disclosed system are sorted by decreasing posterior probabilities, so that the most likely values occur at the top of each list.

In another embodiment, additional nodes are included in the inference network to represent form-external ambient values, such as a time of day, date, season, current weather conditions, etc. These ambient variable nodes in the inference network enable the disclosed system to adjust its suggested field values based on such potentially business-related conditions.

In another embodiment, at periodic intervals, the disclosed system retrains the inference network against an updated set of completed forms to update its structure and conditional probabilities in order to observe and learn new and changing trends.

The disclosed system provides many advantages over prior solutions. In particular, the broad set of information on which the disclosed system operates enables it to better predict correct values for fields compared to previous solutions.

Thus there is disclosed a new system for autocompletion of multiple fields in electronic forms. The new system is generally applicable beyond a predefined set of personal data items, is able to rate and present field options using probabilities based on values of other fields in previously completed forms, and also uses the values of previously filled out fields in a current form with regard to generating the probabilities used to rate and present the options for subsequent fields in a current form.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION OF EXEMPLARY EMBODIMENTS

Figure 1:
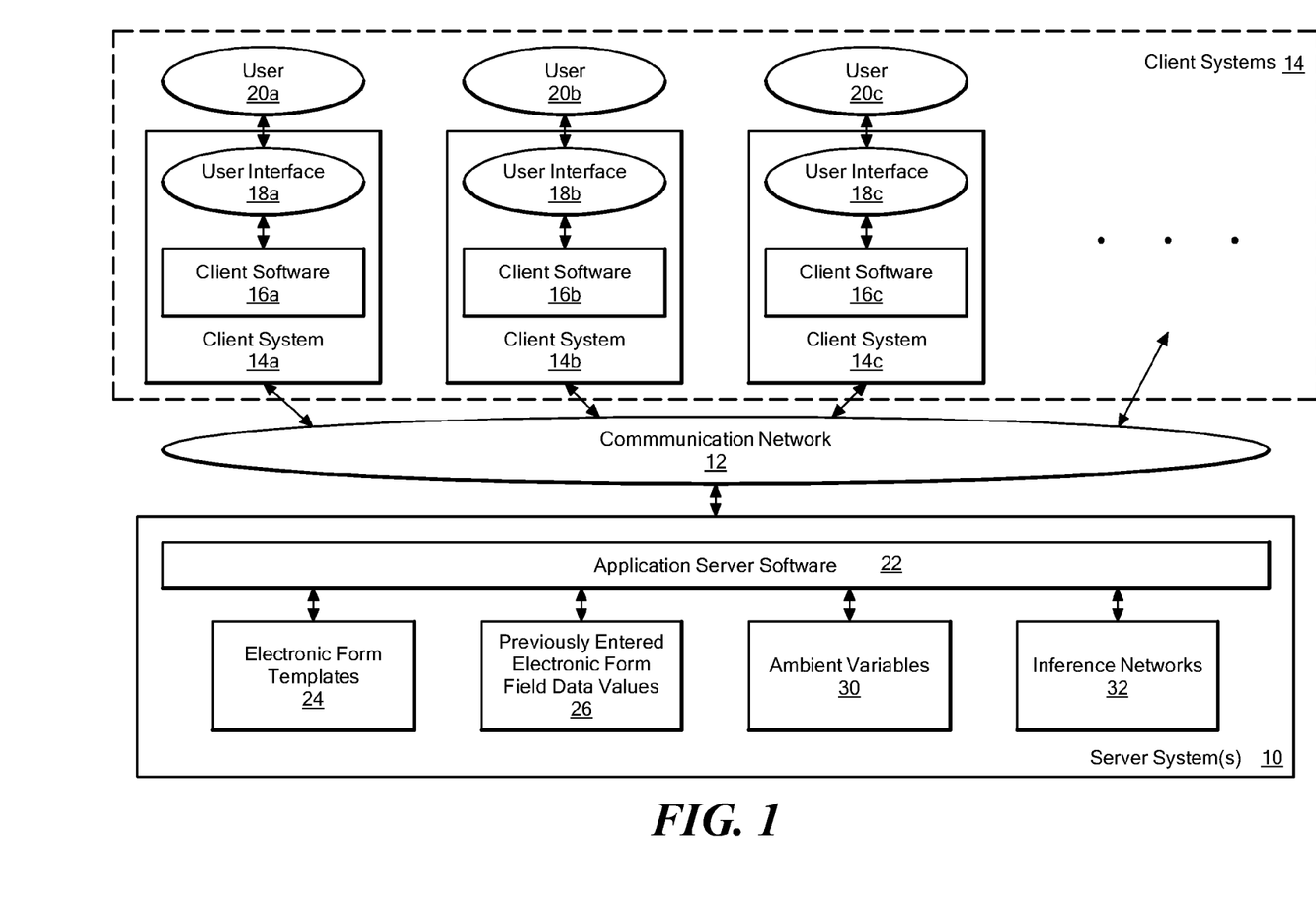
FIG. 1 is a block diagram showing hardware and software components in an operational environment including an illustrative embodiment of the disclosed system.

As shown in FIG. 1, software components in an operational environment including an illustrative embodiment of the disclosed system include server system(s) 10, communication network 12, and client systems 14. The server system(s) 10 is shown including application server software 22, together with electronic form templates 24 and previously entered electronic form field values 26. The client systems 14 include a number of specific client systems, shown for purposes of illustration as including client systems 14a, 14b, 14c, etc. Each of the client systems 14 includes client software 16, shown as client software 16a, 16b, 16c, etc., which generates an interactive form user interface 18, shown as user interfaces 18a, 18b, and 18c. The user interface 18 may be any specific type of interactive form interface, such as, for example, a graphical user interface, telephone keypad, automated ordering system interface for ordering prescription medication refills, system for checking package delivery dates, or any other electronic form user interface. The user interface 18 may be navigated using any specific type of user interface device, such as a computer keyboard or mouse, and/or using voice commands or the like. Each of the client systems 14 is accessible to and used by a corresponding user or users 20, shown as users 20a, 20b and 20c.

The server system(s) 10 may be embodied as any specific number of software processes and/or components executing on one ore more computer systems that are communicably connected. Such computer systems may, for example, each consist of at least one processor, program storage, such as memory, for storing program code executable on the processor, one or more input/output devices and/or interfaces, such as data communication and/or peripheral devices and/or interfaces, and may each further include appropriate operating system software. Similarly, the client systems 14 may include any specific type of computer system or other type of client device, such as, for example, desktop computer systems, PDAs (Personal Digital Assistants), cell phones, tablet PCs, or any other appropriate device capable of providing the user interface 18 to a user. The communication network 12 through which are connected the server system(s) 10 and the client systems 14 may include or be made up of a data communication network, such as the Internet, a Local Area Network (LAN), or any other specific type of communication system or network.

While a client-server embodiment is shown in FIG. 1, in which the user interface 18 is provided by a separate client system 14 from the server system(s) 10, the disclosed system is not so limited. Accordingly, alternative embodiments may include software corresponding to the server application software 22 as well as software corresponding to the client software 16 both with a single computer system.

The user interface 18 may be embodied as any specific type of user interface operable to present electronic forms to a user. For example, in one embodiment, the client software may be made up of a browser application program operable to present Web pages it receives from the communication network to a user through a multi-window graphical user interface.

The application software 22 may be embodied as any specific computer program that operates at least in part by providing electronic forms for display to users, in order to obtain data through fields contained in those electronic forms. For example, applications that use electronic forms include on-line retail Web sites (forms for obtaining user information to support the purchase of goods or services), insurance claims processing software (forms for obtaining information regarding insurance claims), medical records transcribing software (forms for obtaining medical record information), and many others.

The electronic form templates 24 are the form templates stored on the server system(s) 10 that are used to generate form instances each time a user indicates or otherwise causes a form to be selected for presentation and filling out. The electronic form templates 24 may, for example, include XForms code or any other specific type of code appropriate for defining forms in a given embodiment or application.

For example, when a user is visiting on on-line retail site and selects a product for purchase, an appropriate one of the electronic form templates 24 is identified, and a copy of that form (an "instance" of the form) is sent from the server system(s) 10 to the one of the client computer systems 14 for that user. The client computer system then renders the form instance for presentation to the user through the graphical user interface on the client computer system. The user then completes the purchase by filling out the form instance, by entering or otherwise selecting values for the fields contained in the form. The values the user indicated for the fields in the form instance are then conveyed back to the server system(s) 10 in association with the fields they correspond to, for storage in the previously entered electronic form field data values 26.

Multiple different electronic form templates of various specific types and formats may be stored within electronic form templates 24. The different forms stored in the electronic form templates 24 may all be used by single application, or may be used across multiple applications. During operation of the disclosed system, instances of the multiple different electronic form templates are presented to multiple different users for filling out. Accordingly, the previously entered electronic form field data values 26 includes data values entered into instances of multiple different form templates by multiple different users.

During operation of an embodiment of the disclosed system, the Bayesian Inference Networks 32 ("inference networks") are generated based on the previously entered electronic form field data 26. The generated inference networks may be electronically represented and stored by and/or in a memory or other computer readable data storage of the server system 10 using any appropriate data structures and/or electronic representation for a given embodiment. In one embodiment of the disclosed system, a single inference network is built for each of the electronic form templates 24. In such an embodiment, the inference network built for a given form template is based on form field data previously obtained through previously filled in instances of that form template. In an alternative embodiment, the previously entered electronic form field data 26 may be organized such that each previously entered value is associated with the form field value for which it was entered, independent of the specific electronic form template that provided the form instance. For example, in such an alternative embodiment, all values previously entered into fields that are "NAME:" fields can be obtained from the form field values 26 without regard to the specific forms in which the "NAME:" field was provided. Thus, this alternative embodiment builds an inference network for a form template using form field data previously obtained through previously filled in instances of that form template, as well as form field data previously obtained through previously filled in instances of other form templates.

Additionally, a number of ambient variables 30 may be maintained in the server system(s) 10, which reflect variable conditions external to the information obtained from users through the electronic form templates 24. The ambient variables 30 may include any specific indication of a status or condition that may be relevant to predicting the values that are to be entered into fields of instances of the electronic form templates 24. Such information may, for example, consist of predictive data not available from users, or not necessary to obtain through fields of the electronic form templates 24. Examples of ambient variables 30 include current time of day, current date, day of the week, weather conditions, current season, and the like.

During operation of another alternative embodiment of the disclosed system, the inference networks ("inference networks") 32 are generated based on the previously entered electronic form field data values 26 and the ambient variables 30. Each node in each of the inference networks 32 represents a form field present in one of the electronic form templates 24 corresponding to that inference network. The arcs in the inference networks 32 represent conditional probabilities with regard to value options for the fields corresponding to the network nodes. In order to capture significant changes occurring over time in the previously entered electronic form field data values 26, and in the ambient variables 30, building of the inference networks 32 may be repeatedly performed at a periodic interval, or in response to a determination that a certain number of changes have occurred, or based on some other trigger event. When a user obtains an instance of one of the electronic form templates 24 to fill out, the disclosed system obtains an associated one of the inference networks 32, and evaluates the inference network to obtain new posterior probabilities that are used to present value options for unfilled out fields in the form instance to the user in a way that reflects those probabilities, as further described below.

Figure 2:
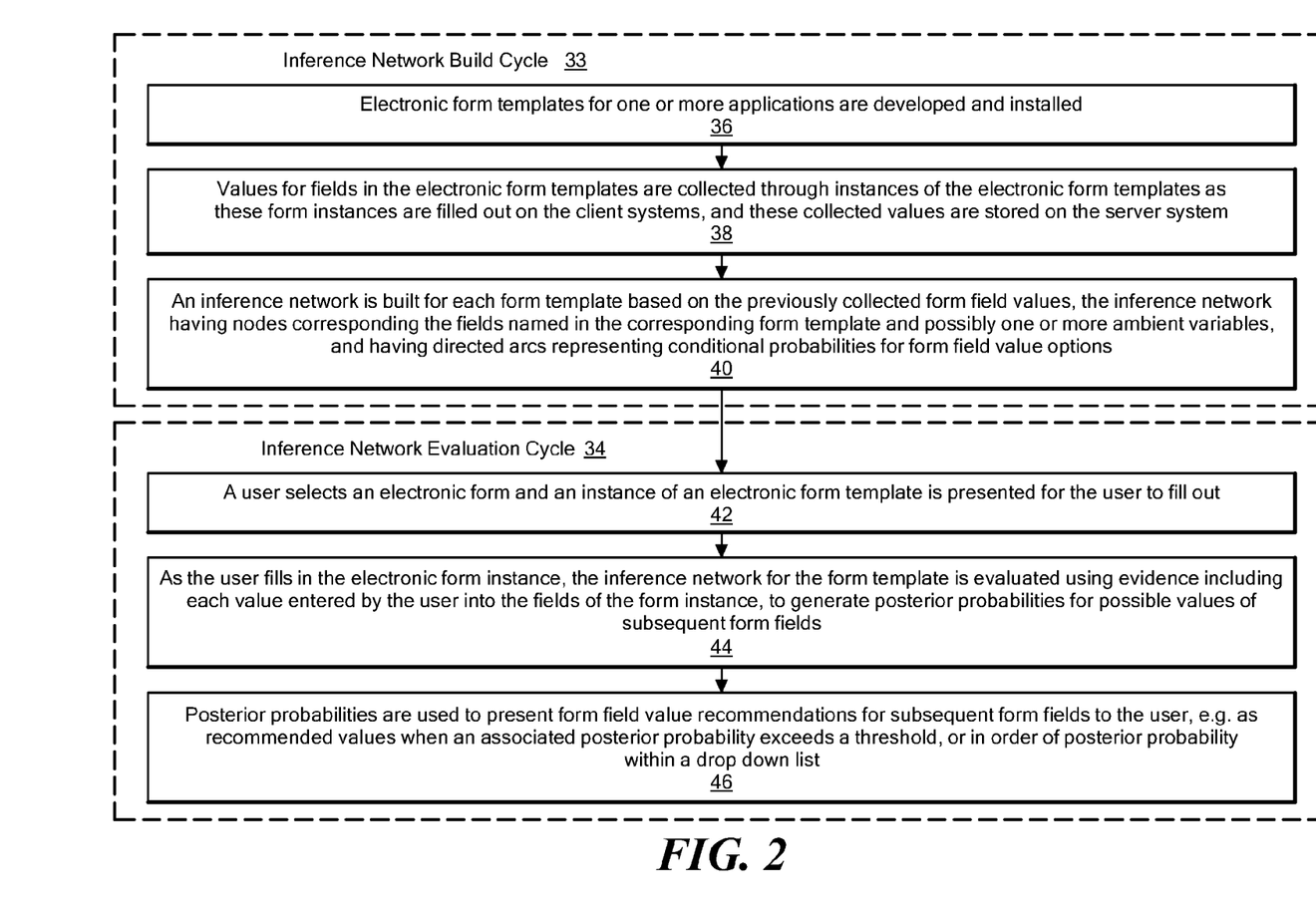
FIG. 2 is a flow chart showing steps performed by an illustrative embodiment of the disclosed system.

FIG. 2 is a flow chart showing steps performed by an illustrative embodiment of the disclosed system. Steps 36, 38 and 40 illustrate one example of a build cycle 33 in which inference networks used in the disclosed system are built. During the build cycle 33, form field data is collected as form instances of form templates are filled out by users, and this data is stored on the server. The inference networks of the disclosed system are built and trained based on this form field data.

Specifically, in the build cycle of the illustrative embodiment shown in FIG. 2, at step 36, electronic form templates are developed and installed for one or more application programs (or other types of computer software). The electronic form templates developed and installed at step 36 may be of any specific type, and may for example, consist of XForm form specifications. At step 38, values for fields specified in the electronic form templates are collected through form instances generated from the electronic form templates, as these form instances are filled out on the client systems. The collected form field values are stored on the server system In step 40, a Bayesian inference network ("inference network") is built for each form template, based on the previously collected form field values from instances of that form template. The inference network for a form template has nodes corresponding to the fields named in that form template, and possibly one or more ambient variables. The inference network for a form template has directed arcs connecting its nodes, where the arcs represent conditional probabilities for possible form field values.

For example, an inference network generated at step 40 might include nodes corresponding to fields named in a corresponding one of the electronic form templates developed and installed at step 36. Thus a node would be formed for a "NAME:" field, an "ADDRESS:" field, and so on for all the fields in a given form template. The directed arcs formed between the nodes of the inference network represent conditional probabilities for possible values of subsequent form fields based on values entered into previous fields.

For example, arcs may initially be formed between each node and every node corresponding to a field that is subsequent to the field for that node. Arcs may also be initially formed from every ambient field to every form field (since an ambient field may influence every field in the form). Whether a field is subsequent to a given node is based on a natural reading order associated with a form. For example, in the case of a form provided in the English language, the natural reading order associated with the form would be left to right, and top to bottom.

In one embodiment, a node representing the first field in a form would, at least initially, have going from it arcs directed to all other nodes in the inference network. Such initially generated arcs indicate that conditional probabilities of values for all subsequent nodes in the inference network may depend at least partly on (or may be partly "inferred from") the value entered into the first field when an instance of the form corresponding to the inference network is filled out. Similarly, a node representing the last field in the form would initially have arcs going to it from all other nodes in the inference network. Such arcs to the last field node of an inference network indicate that conditional probabilities of values for the last field of the form may depend at least partly on (or may be partly "inferred from") values entered into each other field when an instance of the form corresponding to the inference network is filled out.

In addition, the nodes of the inference network include one or more nodes corresponding to ambient variables, which may be used to represent any specific condition appropriate for a given embodiment, such as current date, time, season, or other variable that is maintained externally to and independent of the nodes in the inference network corresponding to form fields. Such ambient fields may have arcs to every field in the form, along with associated conditional probabilities.

Further during step 40, the generated inference network may be "pruned" to eliminate dependency arcs that do not represent significant dependency relationships. This pruning is performed based on previously entered form data, such as the previously entered electronic form data values 26 shown in FIG. 1. The probabilities represented by the remaining arcs in the generated inference network represent the conditional probabilities with regard to dependencies between form fields as indicated by such previously entered form data.

Steps 42, 44 and 46 illustrate one example of an evaluation cycle 34, in which a user fills out a new form instance and the inference network for the corresponding form template is evaluated to generate recommended form field values.

Specifically, in the evaluation cycle of the illustrative embodiment of FIG. 2, at step 42, a user selects an electronic form, and an instance of an electronic form template is presented to the user to fill out on their client computer system. For example, a user may select an electronic form by indicating through the user interface (for example by one or more mouse clicks or the like) that they wish to purchase a good or service from an on-line retailer. Alternatively, a user may select an electronic form by indicating that a new medical record is to be entered into a medical records application. In another example, a user may select an electronic form to be filled out by indicating that information for a new insurance claim is to be entered into an insurance claims processing application. These are only a few examples of the types of forms that may be selected by embodiments of the disclosed system, and any specific type of form may be selected for filling out at step 42.

The instance of the selected electronic form provided to the user at step 42 may, for example, consist or include a copy of one or more HTML documents or the like based on a corresponding form template, and provided from an associated application program for rendering through the user interface.

At step 44, the user fills out the instance of the electronic form selected and provided at step 42. The user fills out the electronic form instance by entering information into the fields of the form instance, for example by typing in information or selecting from options allowed for a given field. As the user fills in the electronic form instance at step 44, the inference network associated with the electronic form is evaluated using evidence including each value entered by the user into the fields of the electronic form instance. The evaluation of the inference network based on this evidence causes posterior probabilities to be generated that indicate probabilities for value options of subsequent form fields.

For example, when the user fills in the first field of the form instance, the value entered or selected by the user is passed as evidence to the inference network, which is evaluated to generate posterior probabilities for possible values of all subsequent fields in the form. In one embodiment, if such a posterior probability exceeds a threshold value, e.g. 95% or some other possibly user defined threshold, the disclosed system operates to present the associated value in the user interface at step 46 as a suggested value, such that the user only need click on that value to enter it into the form field for which it is predicted. This avoids the need for the user to enter in information that can be accurately predicted by the inference network generated for the form, when evaluated based on evidence values provided by the user in fields of the current instance of the form. Other embodiments may use the generated posterior probabilities to suggest certain form field values by putting value options with higher probabilities in relatively higher positions within a drop down list for a given form field value, or in any other appropriate manner. Still other embodiments may provide an indication of higher probability values for a field through the use of visual distinctiveness associated with the display of one or more recommended values, for example through use of special colors, boldness of text, etc.

Figure 3:
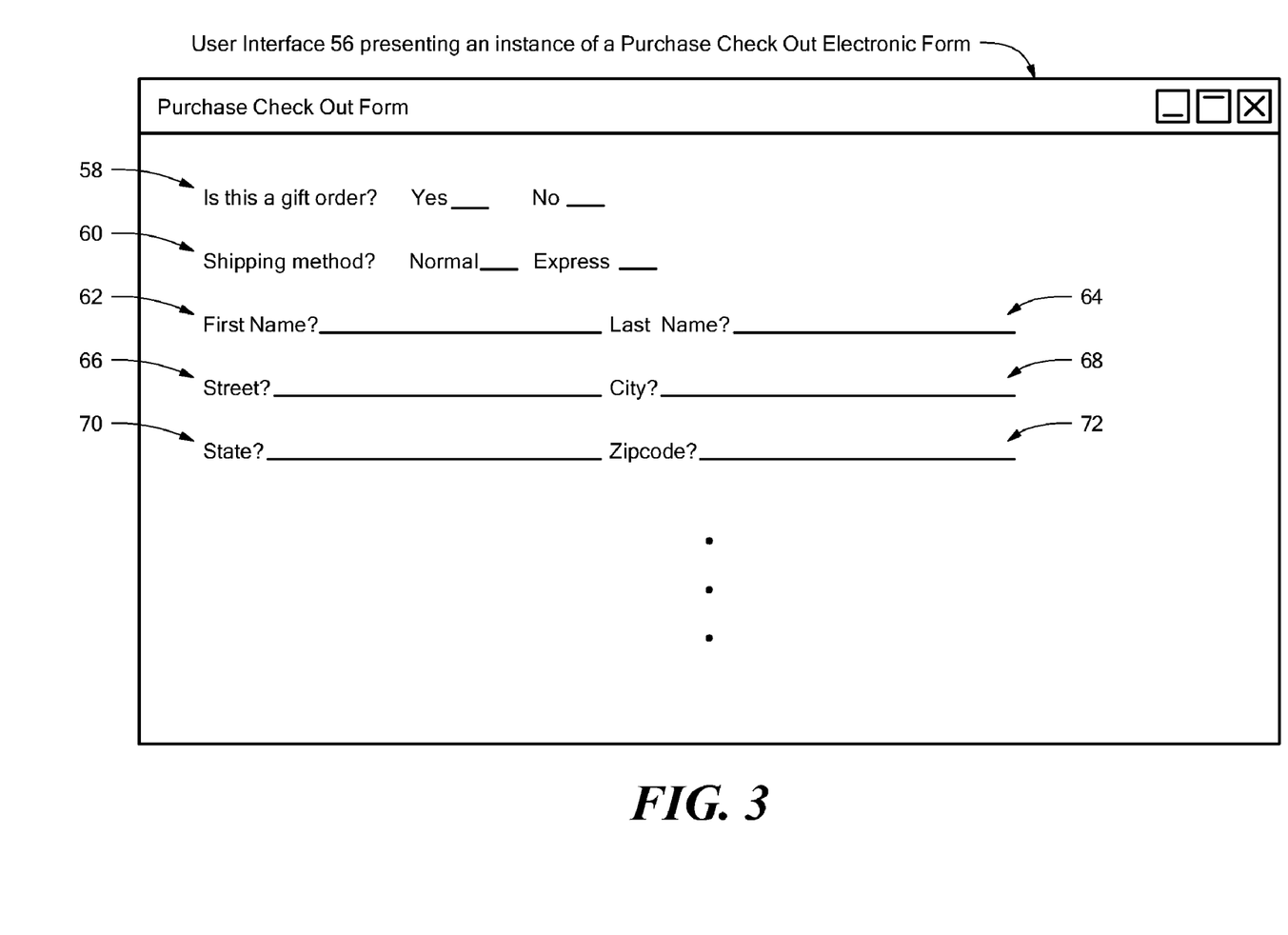
FIG. 3 is a simplified screen shot showing an example of an electronic form instance presented to a user through a graphical user interface in an illustrative embodiment.

FIG. 3 is a simplified screen shot showing an example of an electronic form instance presented to a user through a graphical user interface in an illustrative embodiment. As shown in FIG. 3, a user interface 56 presents an instance of a purchase check out electronic form. The electronic form instance of FIG. 3 would, for example, be presented in response to the user selecting a product or service for purchasing through an online retailer or the like.

As shown in FIG. 3, the fields within the electronic form instance include the following a gift order field 58, a shipping method field 60, a first name field 62, a last name field 64, a street field 66, a city field 68, a state field 70, and a zip code field 72. The user is allowed to indicate a "Yes" or "No" value for the gift order field 58. The user is allowed to indicate a "Normal" or "Express" value for the shipping method field 60. The user is allowed to type in text values for the first name field 62, the last name field 64, the street field 66, the city field 68, the state field 70, and the zip code field 72.

The reading order of the illustrative electronic form instance of FIG. 3 is left to right, top down. Accordingly, the order of the electronic form fields shown in FIG. 3 is as follows: (1) gift order field 58, (2) shipping method field 60, (3) first name field 62, (4) last name field 64, (5) street field 66, (6) city field 68, (7) state field 70, and (8) zip code field 72.

Figure 4:
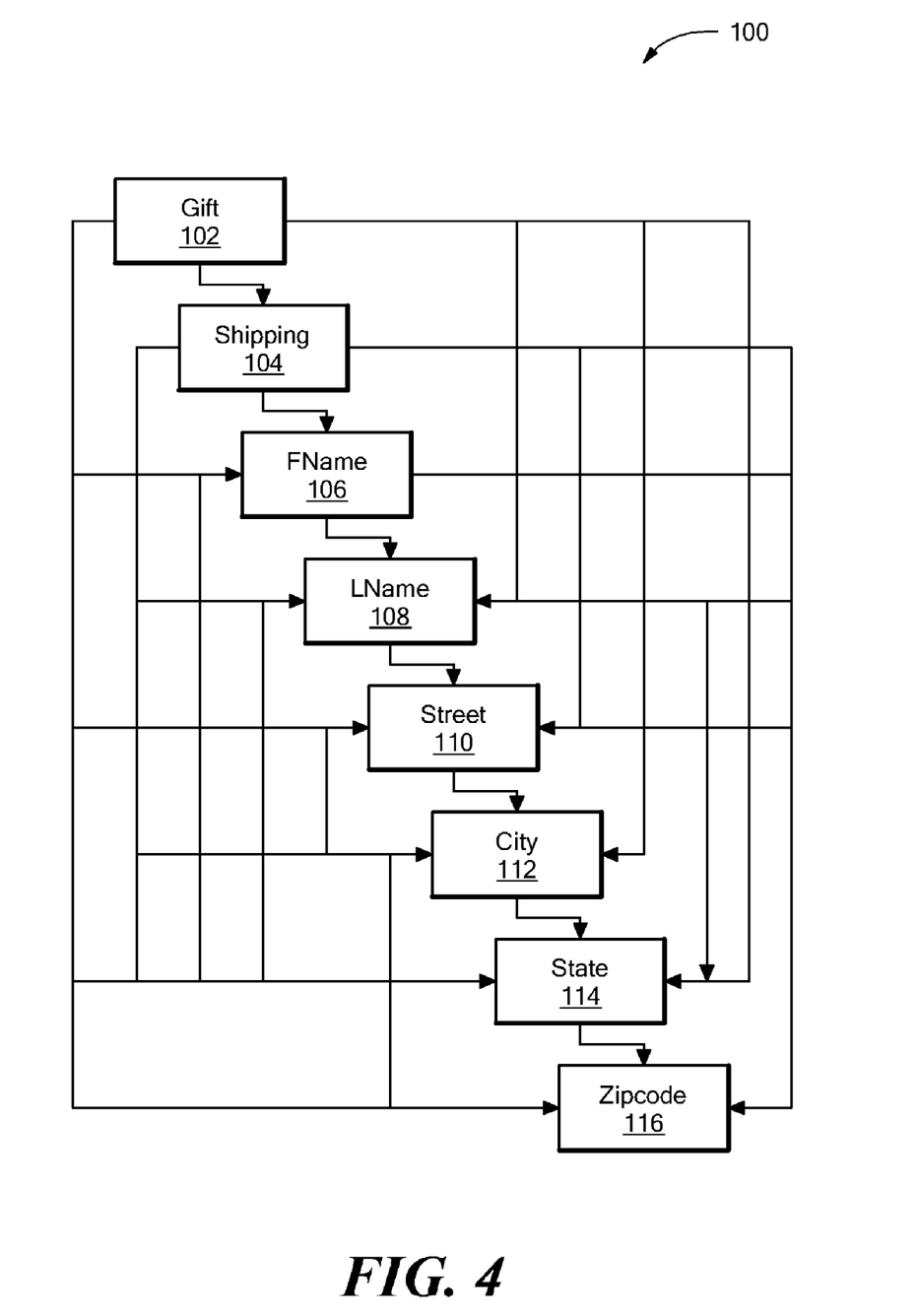
FIG. 4 shows an example of an inference network generated by an illustrative embodiment of the disclosed system.

FIG. 4 shows an example of an inference network 100 generated by an illustrative embodiment of the disclosed system for the electronic form corresponding to the form instance of FIG. 3. As shown in FIG. 4 a "gift" 102 represents the gift order field 58, a "shipping" node 104 represents the shipping method field 60, an "FName" node 106 represents the first name field 62, an "LName" node 108 represents the last name field 64, a "Street" node 110 represents the street field 66, a "City" node 112 represents the city field 68, a "State" node 14 represents the state field 70, and a "Zip" field 116 represents the zip code field 72.

The dependency arcs in the inference network 100 are drawn so that if an arc coming from a first node indicates (points to) a second node, then the probabilities associated with possible values for the second node may be dependent, at least in part, on the value entered by a user into the first node.

The structure of the inference network 100 reflects the reading order of the fields in the form corresponding to the form instance shown in FIG. 3. As shown in FIG. 4, node 102, representing the first field (gift order field 58) in the form based on the reading order, has dependency arcs indicating all the other nodes in the inference network 100, since all other nodes are for form fields that are subsequent to the first field of the form. Similarly, the node 104 representing the second field of the electronic form (shipping method field 60) has dependency arcs indicating all the nodes for subsequent form fields, which consist of all other form fields with the exception of the preceding gift order field 58.

The inference network 100 of FIG. 4 is fully connected, thus indicating potential predictiveness between each form field and all subsequent form fields. However, the data from which the inference network is generated at step 40 of FIG. 2 may indicate that certain arcs in the inference network of FIG. 4 actually have no significant predictive ability. As a result, a pruning of the dependency arcs in the inference network 100 may be performed in an embodiment of the disclosed system, in order to remove such non-predictive arcs from the inference network 100. For example, the previously entered electronic form field data values 26 may indicate that the first name field 62 is not a good predictor of values for the zip code field 72. Accordingly, the dependency arc between the corresponding "FName" field 106 and the "Zip" field 116 could be removed during the pruning process.

Figure 5:
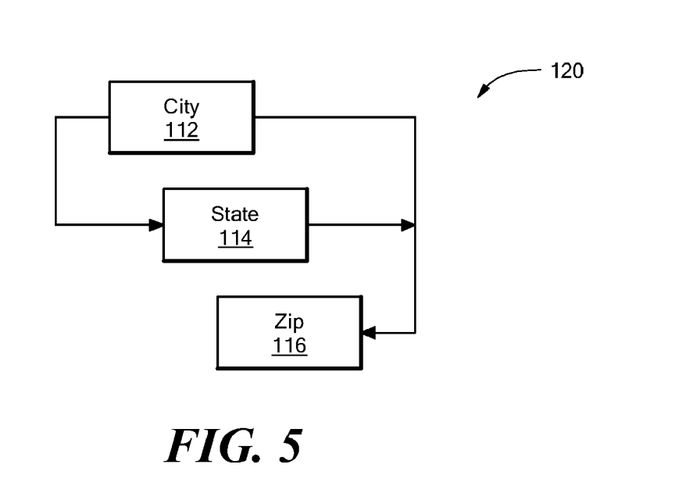
FIG. 5 shows an example of a reduced inference network generated by an illustrative embodiment of the disclosed system.

FIG. 5 shows an example of a reduced inference network 120 generated by an illustrative embodiment of the disclosed system. As shown in FIG. 5, the reduced inference network 120 includes the "City" node 112, the "State" node 114 and the "Zip" node 116. The reduced inference network 120 is an example showing how the inference network 100 of FIG. 4 would be pruned of non-predictive or insufficiently predictive arcs. In the inference network 120, the nodes of the inference network 100 that are no longer present have dropped out entirely, and the user would not be presented with value suggestions for the form fields corresponding to those removed nodes. However, using the reduced inference network 120, when the user enters values for the city and state fields, the disclosed system would evaluate the inference network 120 based on evidence consisting of those entered values, resulting in posterior probabilities associated with the possible zip codes for the city and state. The resulting posterior probabilities for zip code values would, in one embodiment, result in a presentation of a suggested highly probable zip code, which could even be automatically entered by the disclosed system into the zip code field for confirmation by the user. Similarly, in such an embodiment, entering a value for the city field would cause the inference network 120 to be evaluated based on that evidence, and potentially result in determination posterior probabilities including one or more relatively high probability state values, which could similarly be presented as suggestions to the user. If there were more than one state suggested, the suggested states could be presented with the most likely states listed first.

Figure 6:
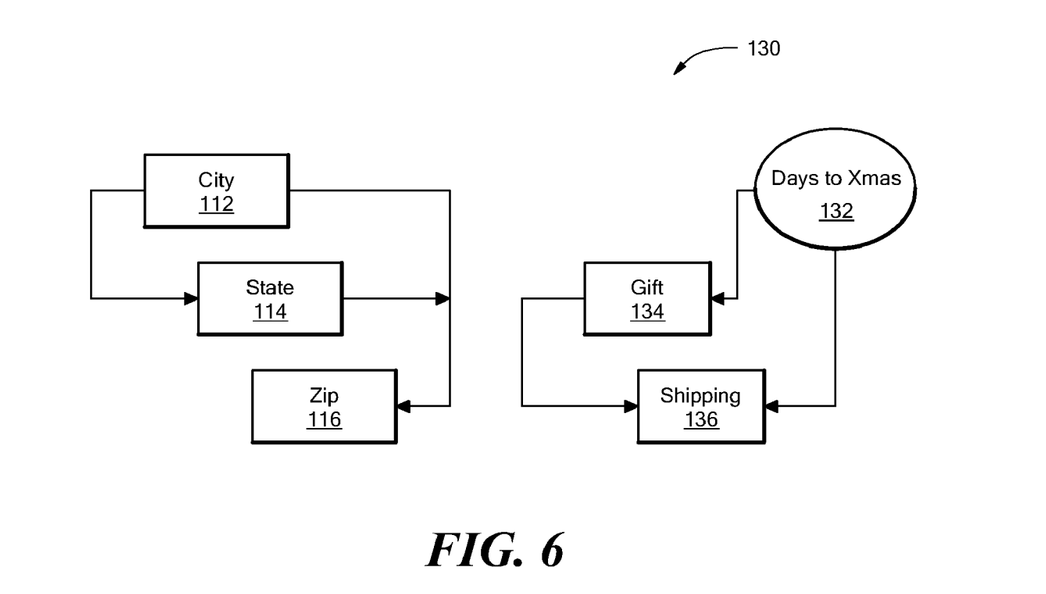
FIG. 6 shows an example of a reduced inference network generated by an illustrative embodiment of the disclosed system including a node corresponding to an ambient variable.

FIG. 6 shows an example of a reduced inference network 130 of FIG. 5, generated by an illustrative embodiment of the disclosed system including a node corresponding to an ambient variable. As shown in FIG. 5, the nodes 112, 114 and 116 are supplemented by a "Days to Xmas" node 132 that represents a variable whose value is the number of shopping days remaining until Christmas. The dependency arcs in FIG. 6 show that the values of the form fields corresponding to the "Gift" node 134 and the "Shipping" node 136 have a dependency on the value of the variable represented by the "Days to Xmas" node 132. In the example of FIG. 6, an embodiment of the disclosed system presents the inference network 130 with an updated value indicating the number of shopping days until Christmas. The number of shopping days until Christmas may have a strong correlation to whether orders are for gifts, and whether they will require express shipping. Accordingly, based on posterior probabilities obtained by evaluating the inference network 130 based on evidence including a current value of the variable represented by node 132, suggested values for the form fields corresponding to nodes 134 and 136 may be automatically generated and displayed. For example, in a case where an order is being made within a week of Christmas, and is a gift order, the disclosed system might automatically recommend expedited shipping, based on trends of similar purchases made under these conditions, for example as indicated by the previously entered electronic form field data values 26 shown in FIG. 1. Thus it is seen that the disclosed use inference network nodes representing ambient, non-form field data is useful to further enhance the predictive ability of embodiments of the disclosed system.

It should be a significant advantage of the disclosed system is that the inference networks are automatically generated and evaluated, without requiring programming by a customer or other user, or by an electronic form developer. The predictiveness of the resulting posterior probabilities flows from the potentially iterative generation of the inference networks based on existing, previously entered form field data values.

Those skilled in the art will recognize that specific techniques for constructing Bayesian Networks are disclosed in various sources. One example of a reference using the basic vocabulary associated with Bayesian Networks is the article "Bayesian Networks without Tears" by Eugene Charniak, AI Magazine, Winter 1991, pages 50-63. Another description of basic Bayesian Network functionality is found in "Learning Bayesian Networks" by Richard Neapolitan (Prentice Hall, 2004), which includes general heuristics for calculating posterior probabilities from a Bayesian Network given a set of evidence values, for calculating the prior and conditional probabilities from an existing set of data, and for automatically generating the structure of a Bayesian Network to model the variables and dependencies of a set of data, including pruning dependencies which have little impact on the posterior probabilities. However, the disclosed system is not limited to any specific techniques in this regard, but rather could be embodied using any specific Bayesian Network techniques appropriate for a given embodiment.

The present invention can be realized in hardware, software, or a combination of hardware and software. A system according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable medium or memory that can direct a computer or other programmable data processing apparatus to function in a particular manner, such that the instructions stored in the computer-readable medium or memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method embodied in a computer system for auto-completion of fields in electronic forms, comprising:
   building an inference network based on form field values previously entered by multiple users into multiple form fields contained in previously completed instances of at least one electronic form template, wherein a plurality of nodes in said inference network represent corresponding ones of a plurality of form fields in said at least one electronic form template, and wherein at least one node in said inference network corresponds to at least one ambient variable representing a current condition external to said values previously entered into said multiple form fields;
   evaluating said inference network in response to a current user filling out a current form field in a current instance of said electronic form template, and wherein said evaluating said inference network is responsive to at least one value previously entered by said current user into at least one preceding form field in said current instance of said electronic form template and to a current value of said ambient variable, wherein said evaluating said inference network determines at least one posterior probability for a possible value associated with an unfilled form field in said current instance of said electronic form template; and
   presenting, through a display device of said computer system, responsive to said posterior probability, a recommended value to said current user such that said recommended value can be selected by said current user to fill in said unfilled form field in said current instance of said electronic form template.

2. The method of claim 1, wherein said at least one electronic form template comprises a plurality of electronic form templates, and wherein said current instance is an instance of one of said plurality of electronic form templates.

3. The method of claim 2, wherein said form fields contained in said instances of said plurality of electronic form templates comprise form fields having names that are names of form fields in said one of said plurality of electronic form templates.

4. The method of claim 1, wherein said presenting said recommended value to said current user is further responsive to a determination that said posterior probability is greater than a predetermined threshold.

5. The method of claim 4, wherein said predetermined threshold comprises a user selected value previously selected by said current user.

6. The method of 5, wherein said inference network comprises:
   a plurality of directed arcs connecting said nodes, wherein each of said directed arcs represents a conditional probability, and wherein said directed arcs interconnect said nodes such that each node corresponding to one of said plurality of form fields in said electronic form template depends on all nodes corresponding to previous form fields in said electronic form template, wherein precedence of said form fields in said electronic form template is based on a natural reading order of said form fields in said electronic form template.

7. The method of claim 6, wherein said natural reading order of said form fields in said electronic form template is left to right, top to bottom.

8. The method of claim 7, wherein said inference network further comprises a plurality of nodes corresponding to a plurality of ambient variables representing current conditions external to said values previously entered into said multiple form fields.

9. The method of claim 8, wherein each of said nodes corresponding to said plurality of ambient variables is associated with a directed arc and associated conditional probability extending to at least one other node in said inference network representing a form field.

10. The method of claim 9, wherein said plurality of ambient variables represent at least one of the group of current conditions consisting of a current time, a current date, a current day of the week, a current season, and a current weather condition.

11. The method of claim 1, wherein said presenting said value option to said current user further comprises presenting a drop down menu including said value option to said current user, wherein said drop down menu includes a plurality of value options ordered by decreasing posterior probabilities.

12. The method of claim 1, wherein said inference network is an electronic representation of a Bayesian network stored in a computer memory.

13. The method of claim 1, further comprising periodically building said inference network based on updated sets of said form field values.

14. A system including at least one processor and a computer readable storage medium, said computer readable storage medium having program code stored thereon for auto-completion of fields in electronic forms, said program code comprising:

program code for building an inference network based on form field values previously entered by multiple users into multiple form fields contained in previously completed instances of at least one electronic form template, wherein a plurality of nodes in said inference network represent corresponding ones of a plurality of form fields in said at least one electronic form template, and wherein at least one node in said inference network corresponds to at least one ambient variable representing a current condition external to said values previously entered into said multiple form fields;

program code for evaluating said inference network in response to a current user filling out a current form field in a current instance of said electronic form template, and wherein said evaluating said inference network is responsive to at least one value previously entered by said current user into at least one preceding form field in said current instance of said electronic form template and to a current value of said ambient variable, wherein said evaluating said inference network determines at least one posterior probability for a possible value associated with an unfilled form field in said current instance of said electronic form template; and program code for presenting, through a display device of said computer system, responsive to said posterior probability, a recommended value to said current user such that said recommended value can be selected by said current user to fill in said unfilled form field in said current instance of said electronic form template.

15. A computer program product including a computer readable storage medium, said computer readable storage medium having program code stored thereon for autocompletion of fields in electronic forms, said program code comprising:

program code for building an inference network based on form field values previously entered by multiple users into multiple form fields contained in previously completed instances of at least one electronic form template, wherein a plurality of nodes in said inference network represent corresponding ones of a plurality of form fields in said at least one electronic form template, and wherein at least one node in said inference network corresponds to at least one ambient variable representing a current condition external to said values previously entered into said multiple form fields;

program code for evaluating said inference network in response to a current user filling out a current form field in a current instance of said electronic form template, and wherein said evaluating said inference network is responsive to at least one value previously entered by said current user into at least one preceding form field in said current instance of said electronic form template and to a current value of said ambient variable, wherein said evaluating said inference network determines at least one posterior probability for a possible value associated with an unfilled form field in said current instance of said electronic form template; and program code for presenting, through a display device of said computer system, responsive to said posterior probability, a recommended value to said current user such that said recommended value can be selected by said current user to fill in said unfilled form field in said current instance of said electronic form template.

* * * * *